(12) United States Patent
Cooley et al.

(10) Patent No.: US 11,045,847 B2
(45) Date of Patent: Jun. 29, 2021

(54) GEOCOMPOSITE COVERING

(71) Applicant: Watershed Geosynthetics, LLC, Alpharetta, GA (US)

(72) Inventors: Bradford Cooley, Alpharetta, GA (US); Michael Ayers, Alpharetta, GA (US)

(73) Assignee: Watershed Geosynthetics LLC, Alpharetta, GA (US)

( * ) Notice: Subject to any disclaimer, the term of this patent is extended or adjusted under 35 U.S.C. 154(b) by 548 days.

(21) Appl. No.: 14/066,383

(22) Filed: Oct. 29, 2013

(65) Prior Publication Data

US 2015/0118418 A1 Apr. 30, 2015

(51) Int. Cl.
| | | |
|---|---|---|
| *B09B 1/00* | (2006.01) | |
| *E02B 3/04* | (2006.01) | |
| *D06N 7/00* | (2006.01) | |
| *E01C 13/08* | (2006.01) | |

(52) U.S. Cl.
CPC ........... *B09B 1/004* (2013.01); *D06N 7/0063* (2013.01); *E02B 3/04* (2013.01); *E01C 13/08* (2013.01); *Y02W 30/30* (2015.05)

(58) Field of Classification Search
CPC . E01C 13/08; B09B 1/004; E02B 3/04; E02B 3/122; Y02W 30/32; B32B 3/16; B32B 5/028; B32B 5/16; B32B 5/30; B32B 7/08; B32B 13/047; B32B 2250/03–05; B32B 2255/26; B32B 2264/107; Y10T 428/23921; Y10T 428/23979; Y10T 428/24372; Y10T 428/2443; Y10T 428/2481;

(Continued)

(56) References Cited

U.S. PATENT DOCUMENTS

| | | | |
|---|---|---|---|
| 5,041,330 A | 8/1991 | Heerten et al. | |
| 5,174,231 A * | 12/1992 | White | B09B 1/00 |
| | | | 112/420 |
| 5,436,050 A | 7/1995 | Carriker et al. | |

(Continued)

FOREIGN PATENT DOCUMENTS

| | | | | |
|---|---|---|---|---|
| WO | WO-9100939 A1 * | 1/1991 | ............... | E01C 9/00 |
| WO | WO 2013067034 A1 * | 5/2013 | ............. | B32B 5/022 |

OTHER PUBLICATIONS

Panda, Achyut et. al. Effect of Sulphuric Acid Treatment on the Physico-Chemical Characteristics of Kaolin Clay, Colloids and Suface A: Physicochemical and Engineering Aspects 363 (2010) p. 98-104.*

(Continued)

*Primary Examiner* — Jennifer A Gillett
(74) *Attorney, Agent, or Firm* — Gardner Groff & Greenwald, PC.

(57) ABSTRACT

A geocomposite covering for placement atop the ground including a lower carrier layer and an intermediate layer of particulate material positioned above the lower carrier layer. A synthetic turf is positioned over the particulate material and is affixed to the lower carrier layer to contain the particulate material between the lower carrier layer and the synthetic turf. The synthetic turf is affixed to the lower carrier layer by one or more of stitches, needle-punched staple fibers, linking fibers, heat bonded fibers, or mechanical fasteners. The particulate material can include clays, cementitious materials, granular material, powder-like material, and the like.

16 Claims, 5 Drawing Sheets

(58) Field of Classification Search
CPC ........... Y10T 428/24893; Y10T 428/25; Y10T 428/252; Y10T 428/24388
See application file for complete search history.

(56) References Cited

U.S. PATENT DOCUMENTS

| | | | | |
|---|---|---|---|---|
| 5,544,976 A * | 8/1996 | Marchbanks | ......... | E02D 31/004 405/129.6 |
| 6,284,681 B1 * | 9/2001 | Langton | ................. | B32B 27/12 442/380 |
| 2003/0215287 A1 * | 11/2003 | Prevost | ..................... | B64F 1/36 404/71 |
| 2005/0048225 A1 * | 3/2005 | Morris | .................... | B32B 25/10 428/17 |
| 2005/0081484 A1 * | 4/2005 | Yland | .................... | E04C 2/284 52/782.1 |
| 2006/0040073 A1 * | 2/2006 | Straughn | ................. | E01C 13/08 428/17 |
| 2007/0206994 A1 * | 9/2007 | Olsta | ......................... | B32B 5/26 405/128.45 |
| 2007/0275207 A1 * | 11/2007 | Higgins | .................... | B32B 5/16 428/95 |
| 2008/0069642 A1 * | 3/2008 | Ayers | ...................... | B09B 1/004 405/129.85 |
| 2011/0311755 A1 * | 12/2011 | Crawford | ............... | D04B 21/14 428/68 |
| 2012/0063854 A1 | 3/2012 | Ayers et al. | | |
| 2012/0064262 A1 | 3/2012 | Ayers et al. | | |
| 2012/0064263 A1 | 3/2012 | Ayers et al. | | |
| 2012/0082839 A1 * | 4/2012 | Ha | .......................... | C04B 22/10 428/221 |

OTHER PUBLICATIONS

Shawabkeh, Reyad. Solidification and Stabilization of Cadmium Ions in Sand-Cement-Clay Mixture. Journal of Hazardous Materials B125 (2005) p. 237-243.*
Complete Textile Glossary, Celanese Acetate LLC, 2001.*

* cited by examiner

GEOCOMPOSITE COVERING

TECHNICAL FIELD

Cross-Reference to Related Application

The present invention relates generally to ground coverings and, in particular, to a composite ground covering such as are typically used for landfill, drainage, flood control, shoreline, and erosion control applications

BACKGROUND

Various coverings are known for covering the ground. For example, in some instances it is known to provide a so-called liner for lining the ground in and around water. Examples of such a tufted geosynthetic clay liner are taught in U.S. Pat. Nos. 5,436,050 and 5,041,330. Those patents relate to a liner for use in landfills to block the migration of liquids and describe a liner which has a carrier sheet, a bentonite clay layer atop the carrier sheet, and a cover sheet atop the bentonite clay layer and stitched to the carrier sheet. Unfortunately, the cover sheet is unsightly and subject to weathering effects. As a result, the liner is typically covered.

Accordingly, it can be seen that a need exist for an improved covering having good aesthetics and weatherability so that it does not need to be covered. It is to the provision of such that the present invention is primarily directed.

SUMMARY

Generally described, the present invention relates to a geocomposite covering for placement atop the ground and includes a lower carrier layer and an intermediate layer of particulate material positioned above the lower carrier layer. A synthetic turf is positioned over the particulate material and is affixed to the lower carrier layer to contain the particulate material between the lower carrier layer and the synthetic turf.

Optionally, the synthetic turf is affixed to the lower carrier layer by one or more of stitches, needle-punched staple fibers, linking fibers, heat bonded fibers, adhesive, or mechanical fasteners.

Preferably, the synthetic turf comprises a plurality of polymer blade-like elements tufted into a synthetic backing.

Optionally, the particulate material in the intermediate layer is granular. Alternatively, the particulate material in the intermediate layer is powder-like.

In one optional form, the particulate material is cementitious. In another optional form, the particulate material comprises clay. The clay can comprise bentonite clay, kaolin clay, or other available clays. Optionally, the particulate material can comprise sand. Optionally, a combination of such materials can be used.

Optionally, the lower carrier layer comprises a geotextile. Optionally, a geotextile lower carrier layer can be laminated or coated with a polymer to reduce permeability of the lower carrier layer. In another optional form, the lower carrier layer can comprise a sheet film.

In another form, an open spacer is positioned between the lower carrier layer and the synthetic turf, with the particulate material positioned around the open spacer.

Optionally, an upper layer can be positioned between the particulate material and the synthetic turf. Moreover, optionally the upper layer comprises a geotextile. The synthetic turf is affixed to this geotextile upper layer by one or more of stitches, needle-punched staple fibers, linking fibers, heat bonding, adhesive, or mechanical fasteners.

In one optional form, a geomembrane is positioned below the lower carrier layer.

Preferably, the intermediate layer of particulate material is placed above the lower carrier layer in a substantially dry condition and then is wetted during or after the geocomposite covering is installed at an installation site.

The specific techniques and structures employed to improve over the drawbacks of the prior devices and accomplish the advantages described herein will become apparent from the following detailed description of example embodiments and the appended drawings and claims.

DETAILED DESCRIPTION OF EXAMPLE EMBODIMENTS

Figure 1:
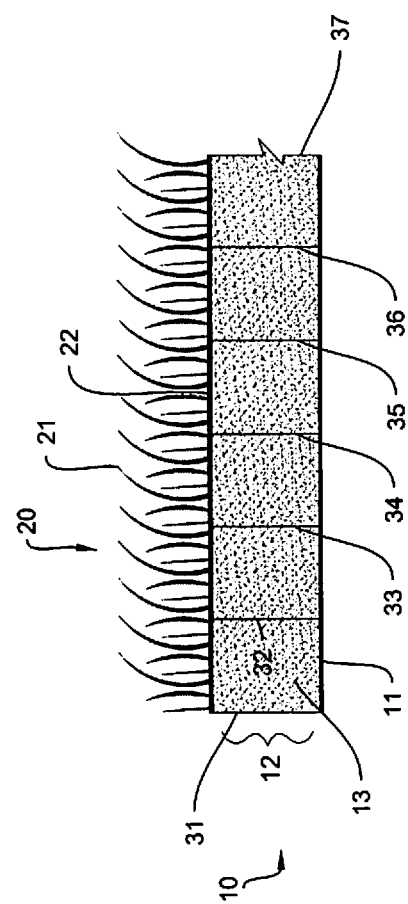
FIG. 1 is a schematic sectional view of a geocomposite covering according to a first example embodiment of the present invention.

Generally described, the present invention relates to a geocomposite ground covering. Turning now to FIG. 1, this figure shows a schematic sectional view of a geocomposite covering 10 according to a first example embodiment of the present invention. The geocomposite covering 10 is for placement atop the ground and includes a lower carrier layer 11 and an intermediate layer 12 of particulate material 13 positioned above the lower carrier layer 11. A synthetic turf 20 is positioned over the particulate material layer 12 and is affixed to the lower carrier layer 11 to contain the particulate material 13 between the lower carrier layer 11 and the synthetic turf 20.

Preferably, the synthetic turf 20 is affixed to the lower carrier layer 11 by one or more of stitches, needle-punched staple fibers, linking fibers, heat bonded fibers, or mechanical fasteners. For example, as shown in this figure, the synthetic turf 20 is affixed to the lower carrier layer 11 by a plurality of stitches 31, 32, 33, 34, 35, 36, 37, etc.

Preferably, the synthetic turf 20 comprises a plurality of polymer blade-like elements 21 tufted into a synthetic backing 22. In one form, the synthetic turf 20 comprises a backing and a plurality of synthetic grass blades tufted into and extending from the backing. U.S. Patent Application No. 2012/0063854, U.S. Patent Application No. 2012/0064262, and U.S. Patent Application No. 2012/0064263 show examples of synthetic turf and are incorporated by reference herein in their entirety. In example forms, the backing comprises one or more geotextile(s), which may be coated to increase tuft bind.

Preferably, the synthetic turf 20 is used as the upper component of the cover system. It can be constructed using a knitting or tufting machine that may use over 1,000 needles to produce a turf width of about 15 feet. Preferably, the synthetic turf includes synthetic grass blades 21 comprising polyethylene monofilament fibers tufted to have a blade length of between about 1 inches and 4 inches. More preferably, the synthetic grass blades 21 are tufted to have a blade length of between about 2 inches and 3 inches. Most preferably, the synthetic grass blades 21 are tufted to have a blade length of about 2½ inches.

Optionally, the synthetic grass blades 21 are tufted to have a density of between about 20 ounces/square yard and about 120 ounces/square yard. Preferably, the synthetic grass blades have a thickness of at least about 100 microns.

The synthetic grass blades 21 are tufted into a substrate 22 comprising of a synthetic woven or non-woven fabric. Optionally, a backing can be secured to the substrate to reinforce the substrate and better secure the synthetic grass blades.

The chemical composition of the synthetic turf 20 should be selected to resist exposure to sunlight, which generates heat and contains ultraviolet radiation. The polymer yarns should not become brittle when subjected to low temperatures. The selection of the synthetic grass color and texture should be aesthetically pleasing.

The actual grass-like components preferably consist of green or tan polyethylene fibers 21 of about 2 to about 2.5 inches in length tufted into a woven or non-woven geotextile (s). The polyethylene grass filaments preferably have an extended operational life of at least 15 years. This invention combines the use of a synthetic grass to provide a pleasant visual appearance on a geocomposite covering requiring very minimal maintenance.

Optionally, the particulate material 13 in the intermediate layer 12 can be granular or powder-like. For example, the particulate material 13 can be cementitious, like cement, mortar, grout, Plaster of Paris, etc. Optionally, the intermediate layer 12 can be filled with Portland cement or concrete, either in a dry, substantially dry, or moist state.

In another optional form, the particulate material 13 can comprise one or more clays, alone or in combination with other materials. For example, the clay can comprise bentonite clay, kaolin clay, or other available clays. Preferably, the clay comprises bentonite clay. Optionally, the clay can be infused with polymers to improve the properties of the clay.

In another optional form, the particulate material 13 can comprise sand, crushed rock, pebbles, etc. These materials can be used alone or in combination with a binder, such as cement or a curable polymer.

Optionally, a combination of cementitious material and clay can be employed. For example, cement and bentonite can be used together as a grout for a combination with strength and low permeability.

Preferably, the intermediate layer 12 of particulate material 13 is placed above the lower carrier layer 11 in a substantially dry condition and then is wetted during or after the geocomposite covering 10 is installed at an installation site. The wetting can operate to initiate a curing of the intermediate layer 12, resulting in a more rigid covering 10 or a more impermeable covering 10.

Optionally, the lower carrier layer 11 comprises a geotextile. Optionally, a geotextile lower carrier layer 11 can be laminated or coated with a polymer to reduce permeability of the lower carrier layer. In another optional form, the lower carrier layer 11 can comprise a sheet film.

Figure 2:
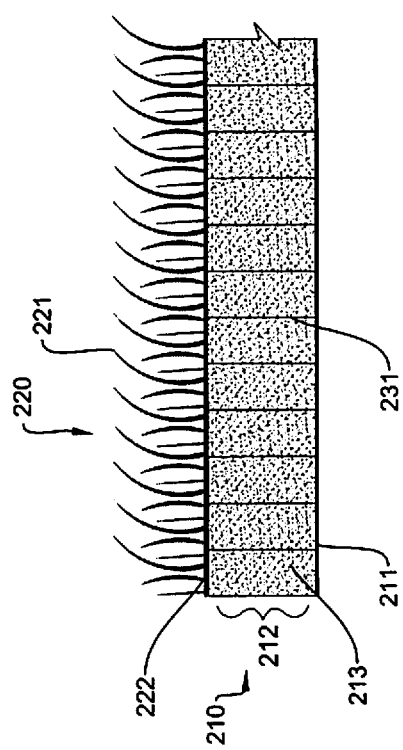
FIG. 2 is a schematic sectional view of a geocomposite covering according to a second example embodiment of the present invention.

FIG. 2 is a schematic sectional view of a geocomposite covering 210 according to a second example embodiment of the present invention. The geocomposite covering 210 is for placement atop the ground and includes a lower carrier layer 211 and an intermediate layer 212 of particulate material 213 positioned above the lower carrier layer 211. A synthetic turf 220 is positioned over the particulate material layer 212 and is affixed to the lower carrier layer 211 to contain the particulate material 213 between the lower carrier layer 211 and the synthetic turf 220. Preferably, the synthetic turf 220 is affixed to the lower carrier layer 211 by a plurality of needle-punched staple fibers, such as needle-punched staple fiber 231, for example. As similarly described above, the synthetic turf 220 comprises synthetic grass blades 221 that are tufted into a substrate 222 comprising of a synthetic woven or non-woven fabric. Optionally, a backing can be secured to the substrate to reinforce the substrate and better secure the synthetic grass blades 221.

Figure 3:
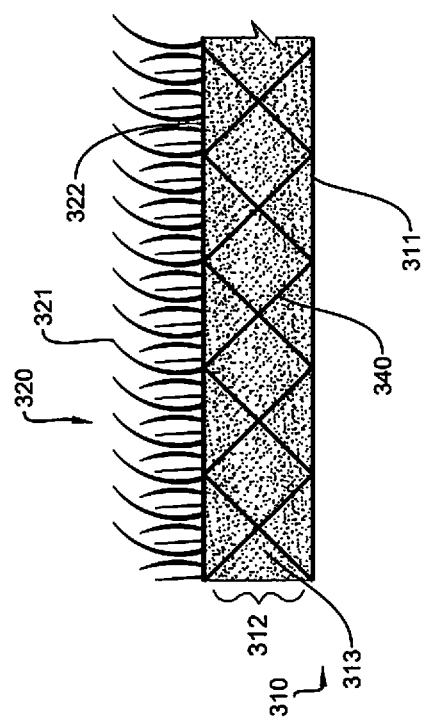
FIG. 3 is a schematic sectional view of a geocomposite covering according to a third example embodiment of the present invention.

FIG. 3, which is a schematic sectional view of a geocomposite covering 310 according to a third example embodiment of the present invention, shows the geocomposite covering 310 as including a spacer 340. The geocomposite covering 310 is for placement atop the ground and includes a lower carrier layer 311 and an intermediate layer 312 of particulate material 313 positioned above the lower carrier layer 311. A synthetic turf 320 is positioned over the particulate material layer 312 and is affixed to the lower carrier layer 311 to contain the particulate material 313 between the lower carrier layer 311 and the synthetic turf 320. As similarly described above, the synthetic turf 320 comprises synthetic grass blades 321 that are tufted into a substrate 322 comprising of a synthetic woven or non-woven fabric. Optionally, a backing can be secured to the substrate to reinforce the substrate and better secure the synthetic grass blades 321. Preferably, the synthetic turf 320 is affixed to the lower carrier layer 311 by one or more of stitches, needle-punched staple fibers, linking fibers, heat bonded fibers, or mechanical fasteners, as described above. An open spacer 340 is positioned between the lower carrier layer 311 and the synthetic turf 320, with the particulate material 313 positioned around the open spacer 340. As shown herein, the example open spacer 340 is in the form of a geometric open gridwork. Optionally, the lower carrier layer 311 and the synthetic turf 320 are affixed to the open spacer 340 by one or more of stitches, needle-punched staple fibers, linking fibers, heat bonding, or mechanical fasteners, as described above. Typically, the open spacer 340 is 0.2 to 1.0 in thick, preferably 0.5 in thick. Typically, the open spacer 340 is comprised of a polymer material. Optionally, the open spacer 340 can be an extruded grid, a multi-layer grid, vertically fibrous structure, spacer fabric, open sets of parallel polymeric ribs at acute angles, or three-dimensional netting. The open spacer 340 can help resist crushing of the space between the lower carrier layer 311 and the synthetic turf 320 and can help hold the particulate material 313 in place between the lower carrier layer 311 and the synthetic turf 320.

Figure 4:
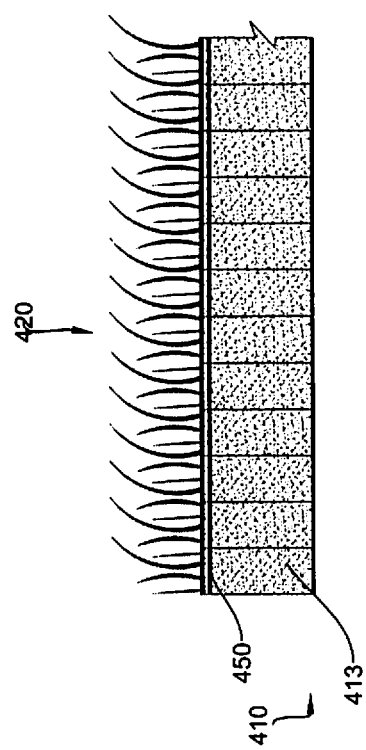
FIG. 4 is a schematic sectional view of a geocomposite covering according to a fourth example embodiment of the present invention.

FIG. 4, which shows a schematic sectional view of a geocomposite covering 410 according to a fourth example embodiment of the present invention (similar to the above), shows an optional upper layer 450 positioned between the particulate material 413 and the synthetic turf 420. Moreover, optionally the upper layer 450 comprises a geotextile. The synthetic turf 420 is affixed to this geotextile upper layer by one or more of stitches, needle-punched staple fibers, linking fibers, heat bonding, adhesive, or mechanical fasteners.

Figure 5:
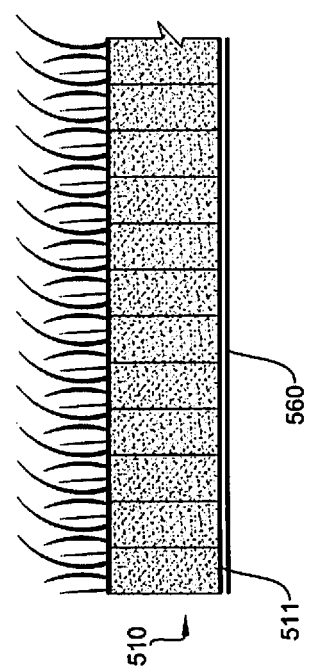
FIG. 5 is a schematic sectional view of a geocomposite covering according to a fifth example embodiment of the present invention.

Turning now to FIG. 5, which shows is a schematic sectional view of a geocomposite covering 510 according to a fifth example embodiment of the present invention (similar to the above), the geocomposite covering 510 including a lower geomembrane 560 positioned below and is preferably not affixed to the carrier layer 511. This has the advantage of providing greater impermeability as a redundant, composite system. This is important for sealing applications as well as hydraulic applications.

A preferred method for manufacturing the product is as follows. Essentially, the lower carrier layer is rolled out and a hopper evenly drops the particulate matter on to the lower carrier layer. Next, the upper synthetic turf layer is placed on top of the particulate material. Lastly, the sandwich is affixed together (such as by stitching). The clay or cement can be placed in a "near-dry" condition. It can also be placed slightly moist. The product, which preferably is to be placed atop the carrier layer in near-dry condition, is later hydrated (wetted). It can be hydrated naturally (as by rain) or it may be purposefully/actively watered. If using clay, the passive wetting as by allowing rain to fall on it is adequate and preferred. If one is using cement, concrete or other cementitious material, it is preferred that the wetting be actively accomplished, rather than leaving the wetting up to the weather. When wetted, the clay will expand some and provide a low permeability layer/liner. When wetted, the cement/concrete will harden and cure.

It is to be understood that this invention is not limited to the specific devices, methods, conditions, or parameters of the example embodiments described and/or shown herein, and that the terminology used herein is for the purpose of describing particular embodiments by way of example only. Thus, the terminology is intended to be broadly construed and is not intended to be unnecessarily limiting of the claimed invention. For example, as used in the specification including the appended claims, the singular forms "a," "an," and "the" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the claimed invention has been shown and described in example forms, it will be apparent to those skilled in the art that many modifications, additions, and deletions can be made therein without departing from the spirit and scope of the invention as defined by the following claims.

What is claimed is:

1. A geocomposite ground covering for placement atop the ground, comprising:
   an intermediate layer of particulate material, wherein at least a portion of the particulate material is cementitious and wherein the intermediate layer is sandwiched between a synthetic turf positioned over the particulate material and a lower carrier layer, wherein the synthetic turf is secured directly to the lower carrier layer and through the intermediate layer to contain and capture the particulate material between the lower carrier layer and the synthetic turf, wherein a qeomembrane is positioned below the lower carrier layer, and wherein the lower carrier layer is laminated or coated with a polymer to reduce permeability of the lower carrier layer.

2. The geocomposite ground covering of claim 1, wherein the synthetic turf comprises a plurality of elongate polymer elements shaped like blades of grass and tufted into a synthetic backing.

3. The geocomposite ground covering of claim 1, wherein at least a portion of the particulate material in the intermediate layer is granular.

4. The geocomposite ground covering of claim 1, wherein at least a portion of the particulate material in the intermediate layer comprises powder.

5. The geocomposite ground covering of claim 1, wherein at least a portion of the particulate material comprises clay.

6. The geocomposite ground covering of claim 1, wherein the particulate material comprises a blend of sand, clay, or cementitious materials.

7. The geocomposite ground covering of claim 1, wherein at least a portion of the particulate material comprises sand.

8. The geocomposite ground covering of claim 1, further comprising an open spacer positioned between the lower carrier layer and the synthetic turf, with the particulate material positioned around the open spacer.

9. The geocomposite ground covering of claim 1, further comprising an upper layer positioned between particulate material and the synthetic turf.

10. The geocomposite ground covering of claim 9, wherein the upper layer comprises a geotextile.

11. The geocomposite ground covering of claim 5, wherein the clay comprises bentonite clay.

12. The geocomposite ground covering of claim 5, wherein the clay comprises kaolin.

13. The geocomposite ground covering of claim 1, wherein the intermediate layer of particulate material is placed above the lower carrier layer in a substantially dry condition.

14. The geocomposite ground covering of claim 1, wherein the intermediate layer of particulate material is wetted during or after the geocomposite covering is installed at an installation site.

15. The geocomposite ground covering of claim 1, wherein the lower carrier layer comprises a geotextile.

16. The geocomposite ground covering of claim 1, wherein the lower carrier layer comprises a sheet film.

* * * * *